United States Patent [19]
Saito et al.

[11] Patent Number: 4,732,454
[45] Date of Patent: Mar. 22, 1988

[54] LIGHT-TRANSMISSIBLE PLATE SHIELDING ELECTROMAGNETIC WAVES

[75] Inventors: Takeshi Saito, Otsu; Kazuo Okamoto, Jyoyo; Masaki Tsuchida, Kusatsu; Satoshi Nagai, Otsu, all of Japan

[73] Assignee: Toray Industries, Inc., Tokyo, Japan

[21] Appl. No.: 853,035

[22] Filed: Apr. 17, 1986

[30] Foreign Application Priority Data

Apr. 22, 1985 [JP] Japan ................... 60-84662
Apr. 23, 1985 [JP] Japan ................... 60-87167
Dec. 23, 1985 [JP] Japan ................... 60-287827

[51] Int. Cl.$^4$ ................................. G02B 1/10
[52] U.S. Cl. ................. 350/164; 250/492.21; 350/163
[58] Field of Search .......... 350/164, 165, 163, 166; 250/492.21

[56] References Cited

U.S. PATENT DOCUMENTS

| | | | |
|---|---|---|---|
| 3,984,581 | 10/1976 | Dobler et al. | 350/165 |
| 4,091,166 | 5/1978 | Kubacki | 350/165 |
| 4,128,303 | 12/1978 | Onoki et al. | 350/164 |
| 4,132,919 | 1/1979 | Maple | 350/164 |
| 4,381,421 | 4/1983 | Coats et al. | 174/35 R |
| 4,412,255 | 10/1983 | Kuhlman et al. | 358/245 |
| 4,422,721 | 12/1983 | Hahn et al. | 350/164 |
| 4,433,247 | 2/1984 | Turner | 250/492.21 |
| 4,503,329 | 3/1985 | Yamaguchi et al. | 250/492.21 |
| 4,507,547 | 3/1985 | Taga et al. | 350/164 |
| 4,547,397 | 10/1985 | Borzynski et al. | 350/165 |
| 4,556,599 | 12/1985 | Sato et al. | 350/164 |
| 4,609,267 | 9/1986 | Deguchi et al. | 350/164 |

FOREIGN PATENT DOCUMENTS

| | | |
|---|---|---|
| 0072782 | 2/1983 | European Pat. Off. . |
| 0145201 | 6/1985 | European Pat. Off. . |
| 45-6193 | 3/1970 | Japan . |
| 49-18447 | 5/1974 | Japan . |
| 56-113101 | 9/1981 | Japan . |
| 59-48702 | 3/1984 | Japan . |
| 59-78304 | 5/1984 | Japan . |
| 59-78301 | 5/1984 | Japan . |
| 59-114501 | 7/1984 | Japan . |
| 60-32053 | 2/1985 | Japan . |

Primary Examiner—John K. Corbin
Assistant Examiner—Martin Lerner
Attorney, Agent, or Firm—Birch, Stewart, Kolasch & Birch

[57] ABSTRACT

A light-transmissible plate having the function of shielding electromagnetic waves includes a transparent plastic base plate, a hard coating layer on the base plate, an electroconductive layer on the hard coating layer and a layer having low refractive index on the electroconductive layer. The plate can shield electromagnetic waves, and can have high damage resistance even if the plastic constituting the base plate has low surface hardness. Moreover, it is possible to give the plate the ability to prevent reflection. A light-transmissible plate according to a second embodiment of the present invention includes an anti-reflection film composed of a plurality of layers on a surface opposite to the surface on which the electroconductive layer is provided. Because the film has excellent characteristics in accordance with strength of adhesion, durability, abrasion resistance, wear resistance, shock resistance, chemical resistance, flexibility, heat resistance, light resistance, weather resistance and static charge resistance, the plate has excellent functions of shielding electromagnetic waves, eliminating static electricity and preventing reflection. As a result, the plate is an excellent optical product as a whole.

22 Claims, 8 Drawing Figures

LIGHT-TRANSMISSIBLE PLATE SHIELDING ELECTROMAGNETIC WAVES

BACKGROUND OF THE INVENTION

1. Field of the Invention

The present invention relates to a light-transmissible plastic plate which shields electromagnetic waves. More particularly, the present invention relates to a light-transmissible plate capable of effectively shielding deleterious electromagnetic waves which are generated from, for example, a display or a Braun tube. Moreover, the present invention relates to a light-transmissible plate having durability and the ability to reduce reflection.

2. Description of the Prior Art

Displays of office automation equipment, for example, word processors or computers, or Braun tubes of game machines or television sets generate deleterious electromagnetic waves. There are some problems due to the electormagnetic waves, which are often pointed out, for example, problems with respect to health and noises which influence other equipment. For instance, often false signals due to noises come into a computer. Also, noises of a stereo are generated when both the stereo and a television set are operating at the same time.

Many improvements have been carried out to eliminate these problems. One of the improvements is a method of covering the equipment which generates electromagnetic waves with an electroconductive material such as a metal. For example, a cloth capable of shielding electromagnetic waves and an "Eyesaver" (the trade name of a commodity of Chori Kabushiki Kaisha, a Japanese company) are known. The cloth is constructed by adhering carbon onto a fiber with a small diameter and then weaving the fiber to form a meshed structure, and the cloth is applied on equipment which generates electromagnetic waves. "Eyesaver" is constructed of glasses and metal wire positioned between the glasses.

However, since the above methods cause a partial intercepting of the ray from a display, it becomes rather difficult for an operator of the equipment to look at the display clearly.

A method for forming an evaportion coating layer of electroconductive material on a glass base plate is also known. Such a method is disclosed, for example, in Japanese Patent Publication No. SHO 49-18447. However, when the method is applied to a plastic base plate, the base plate is liable to soften or to melt, and is liable to be injured at the surface. Therefore, the method cannot be applied for manufacturing a light-transmissible plastic plate.

Moreover, with respect to anti-reflection film technology, various forming methods and various structures thereof are disclosed. Japanese Patent Publications No. SHO 59-48702, SHO 59-78301 and SHO 59-78304 disclose a method wherein a hard coating film comprising a polyorganosilane or a hardened film comprising an epoxy resin is formed on a plastic base plate and then an anti-reflection film comprising inorganic material is coated on the above hard coating layer. Japanese Patent Publication No. SHO 56-113101 discloses a structure wherein an anti-reflection film comprising a plurality of oxide compound layers is provided on a plastic base plate. The structure has high hardness at the surface and a satisfactory anti-reflection function, but adhesion between the base plate and the film, heat resistance, shock resistance, hot water resistance and weather resistance thereof are not satisfactory. Japanese Patent Publications No. SHO 45-6193, SHO 59-48702, SHO 59-78301 and SHO 50-78304 disclose other structures including other anti-reflection films, but the adhesion between the base plate and the anti-reflection film in these structures is also unsatisfactory, and the surfaces of anti-reflection films are liable to be damaged. Moreover, the plates are liable to be damaged by water or alohol, and the structures have adhesion problems between the base plate and the film after dipping the plate into hot water and also in severe weather.

Although several conventional technologies have been described, all of these technologies have a problem in accordance with adhesion between a hard coating layer provided on a base plate and a layer of anti-reflection film provided on the hard coating layer. Therefore, the anti-reflection film tends to separate from the hard coating layer over a long period of time.

SUMMARY OF THE INVENTION

An object of the present invention is to provide a light-transmissible plate which can shield electromagnetic waves wherein an electroconductive layer is coated on a base plate, even if the base plate is constructed of a plastic material.

Another object of the present invention is to provide a procedure by which hardness at a surface of the light-transmissible plate can be increased by providing a layer constructed of silica on the surface of a base plate, thereby giving the property of abrasion resistance to the light-transmissible plate.

A further object of the present invention is to provide a procedure by which the light-transmissible plate can also have a function of anti-reflection by providing a layer having a low refractive index on a surface of the electroconductive layer.

Still another object of the present invention is to provide a light-transmissible plate which includes an anti-reflection film having excellent adhesion strength between the film and the hard coating layer and excellent durability, excellent abrasion resistance, wear resistance, shock resistance, chemical resistance, flexibility, heat resistance, light resistance, weather resistance and static charge resistance.

To accomplish the above objects, a light-transmissible plate according to the present invention comprises:

(1) A light-transmissible plate shielding electromagnetic waves comprising a transparent plastic base plate, a hard coating layer provided on a surface of the base plate, the hard coating layer having scratch resistance, an electroconductive layer provided on the surface of the hard coating layer, and a layer provided on the surface of the electroconductive layer, the layer having a lower refractive index than the refractive index of the electroconductive layer.

(2) A light-transmissible plate shielding electromagnetic waves comprising a transparent plastic base plate, a hard coating layer provided on one surface of the base plate, the hard coating layer having scratch resistance, an electroconductive layer provided on the surface of the hard coating layer, a layer provided on the surface of the electroconductive layer, the layer having a lower refractive index than the refractive index of the electroconductive layer, and an anti-reflection film provided on another surface of the base plate, the anti-reflection film being composed of a plurality of layers.

BRIEF DESCRIPTION OF THE DRAWINGS

The present invention will be better understood from the following detailed description taken with accompanying drawings and wherein:

In FIG. 3, hole 9 is provided through the light-transmissible plate 100, and a grounding wire 15 is connected thereto via metal fitting piece 6a. In the connection, it is desirable to use a metal packing 7. Metal fitting piece 6a is fixed by a fixing means, for example, set screw 10a and nut 10b (FIG. 3), or a caulking piece 8 (FIG. 4). Then the portion of the connection is covered by a plastic cover 11. FIG. 5 shows an embodiment wherein metal fitting piece 6a is fixed nearly parallel to light-transmissible plate 100 in plastic cover 11. FIG. 6 shows an embodiment wherein helical insert 12 is fitted into hole 9 and grounding wire 15 is fixed by screw 13 via metal fitting piece 6a. In this case, providing a hole 11a on the cover 11 facilitates removing the screw 13, and the structure is convenient for removing light-transmissible plate 100 from equipment or cleaning the plate 100. FIG. 7 shows an embodiment wherein grounding wire 15 is connected to the plate 100 via adjuster 14a and 14b.

DETAILED DESCRIPTION OF THE PREFERRED EMBODIMENTS

Figure 2:
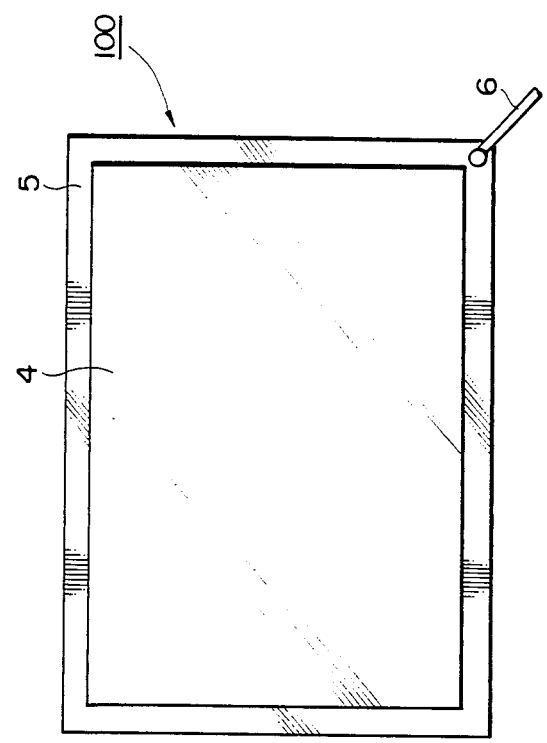
FIG. 2 is a plan view of a light-transmissible plate 100 in FIG. 1. Exposed surface 5 of electroconductive layer 3 may be formed either along the entire periphery of the light-transmissible plate 100, or along only a part of the periphery. For shielding electromagnetic waves and/or for eliminating static electricity, a metal frame (not shown) is provided around the plate 100 so as to contact with electroconductive layer 3, or grounding wire 6 is connected to the electroconductive layer 3. The grounding wire 6 is connected desirably to a corner of electroconductive layer 3.
Figure 1:
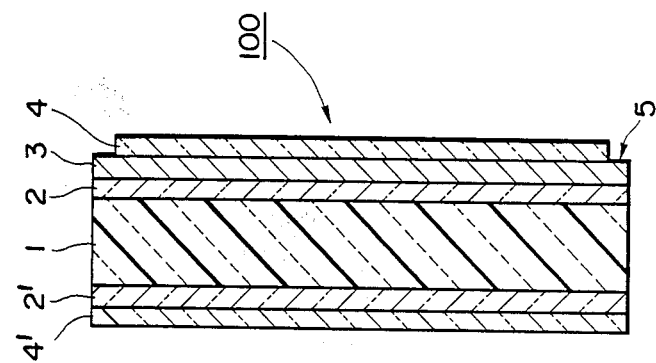
FIG. 1 is a iron sectional view of a light-transmissible plate having the function of shielding electromagnetic waves and the function of resisting static charge according to one embodiment of the present invention. Light-transmissible plate 100 is constituted as follows. Hard coating layer 2 is provided on one surface of the transparent base plate 1, and the hard coating layer 2 has scratch resistance. Electroconductive layer 3 is provided on a surface of the hard coating layer 2. Layer 4 is provided on a surface of the electroconductive layer 3, and layer 4 has a lower refractive index than the refractive index of the electroconductive layer 3. On another surface of base plate 1, hard coating layer 2' having scratch resistance is provided, and a anti-reflection film 4' is provided on the hard coating layer 2'. Numeral 5 shows a portion of an exposed surface of electroconductive layer 3. Light-transmissible plate 100 is disposed so as to direct a surface having electroconductive layer 3 toward a surface generating picture image, for example, a surface of a cathode-ray tube.
Figure 3:
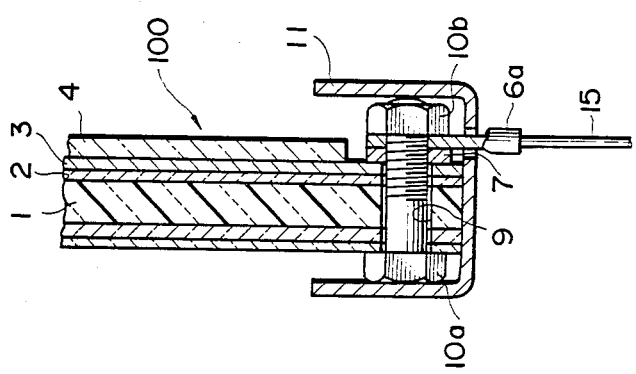
FIG. 3-7 show preferred embodiments according to the present invention in accordance with a portion of connecting an earthing wire.
Figure 4:
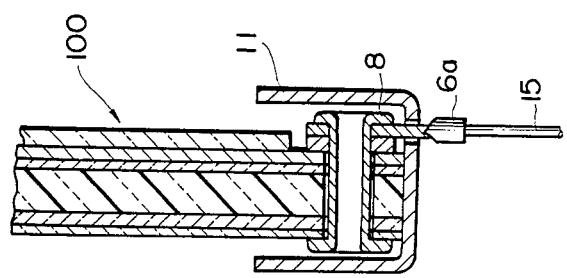
Figure 5:
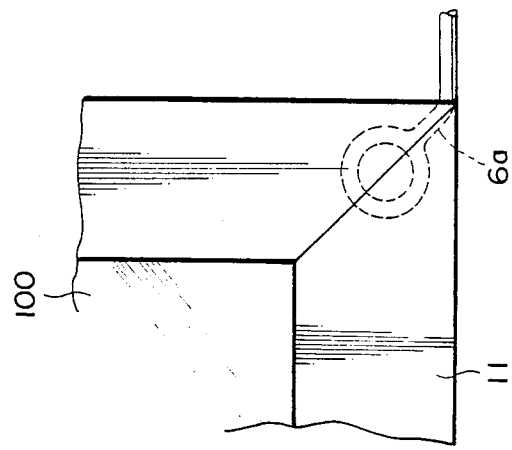
Figure 8:
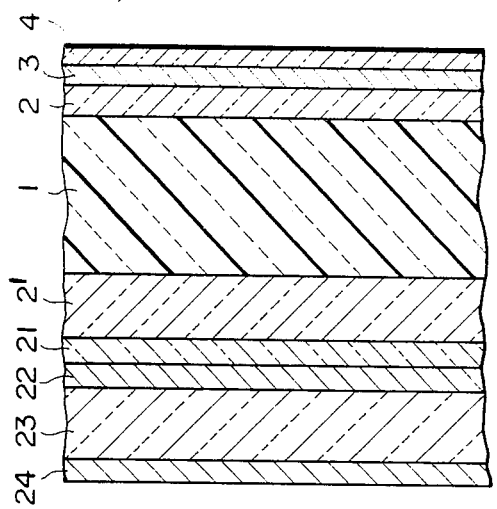
FIG. 8 is a partial cross sectional view of a light-transmissible plate having an anti-reflection film constituted by a plurality of layers according to a second embodiment of the present invention. On one surface of transparent plastic base plate 1, hard coating layer 2, electroconductive layer 3 and layer 4 having a lower refractive index than the refractive index of electroconductive layer 3 are provided, and on another surface of base plate 1, hard coating layer 2' having scratch resistance and anti-reflection film 20 are provided. Anti-reflection film 20 is constructed of No. 1 layer 21, No. 2 layer 22, No. 3 layer 23 and No. 4 layer 24.
Figure 7:
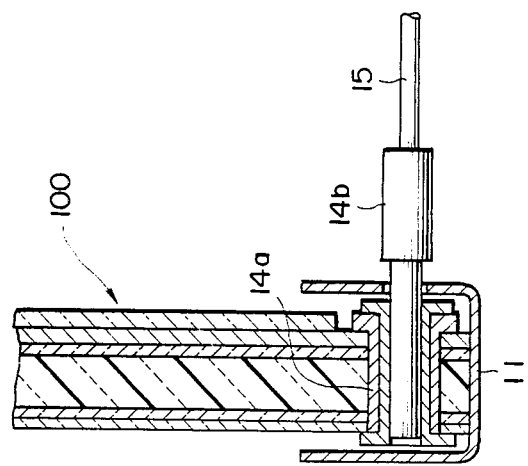
Figure 6:
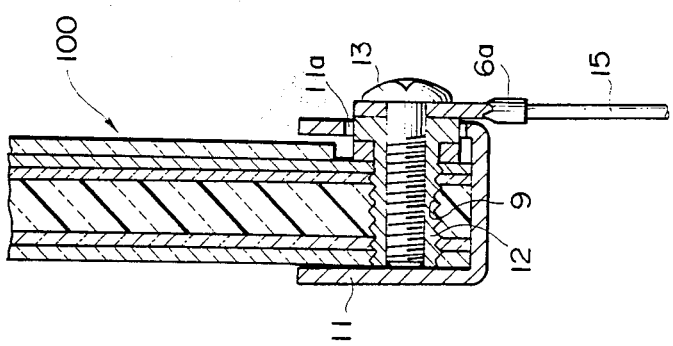

First, the first embodiment of the present invention is described.

A hard coating layer having scratch resistance is provided on a surface of a transparent plastic base plate. The plastic constituting the base plate may be selected from any conventional plastic. The transparent base plate means any plastic plate capable of transmitting light. In the case that a light-transmissible plate is used for a display of a word processor etc., it is desirable to apply a base plate set to the transmittance of visible rays of 25-70% by coloring itself or dyeing. The fatigue of the eyes of an operator is reduced by the above restriction. The hard coating layer having scratch resistance means a coating layer having high hardness, for example, a layer including polyorganosiloxane, silica or alumina, or a coating layer constructed of a hardening paint, for example, an acrylic paint. Although a surface of a plastic plate is generally liable to be damaged, characteristics of the surface can be improved by the hard coating layer, and at the same time, adhesion of a layer shielding electromagnetic waves is raised by undercoating the hard coating layer. Most preferably, the hard coating layer consists of a polyorganosiloxane which is produced by heat-condensing after coating methyltrymethorysilane and vinyltryethoxysilane or after coating hydrolysis compound thereof. Desirable film thickness of the hard coating layer is in the range of about 1–10$\mu$. The hard coating layer including the acrylic is constructed of, for example, a compound crosslinked with an acrylic compound and an ester compound. The acrylic compound is constructed of, for example, methacrylic acid and the ester compound is constructed of, for example, an ester compound being produced from an ester and a polyfunctional glycol, for example, pentaerythritol or glycerin.

Next, an electroconductive layer is provided on a surface of the hard coating layer. Any material having electroconductivity and capable of transmitting light can be used for the electroconductive layer, but preferably the layer is constructed of a mixture with indium oxide ($In_2O_3$) and tin oxide ($SnO_2$). The mixture is also called "ITO" hereinafter in this specification. "ITO" has high electroconductivity, can shield electromagnetic waves effectively, and can transmit visible rays. A film thickness of the "ITO" layer may be any thickness as long as the layer can satisfy the above functions. A desirable thickness is in the range of 100–3000 Å. If a thickness of more than 3000 Å is utilized, cracking ion occur. The "ITO" layer can be coated by sputtering. Other methods can be applied for forming the "ITO" layer. For example, the "ITO" layer is formed by evaporation coating using plasma due to high-frequency electric discharge in an atmosphere of oxygen and in a temperature condition of less than 150° C., with the assistance of an ion gun.

Next, a layer having a lower refractive index than the refractive index of the electroconductive layer is provided on the surface of the electroconductive layer. Generally, since an electroconductive layer includes metal, the refractive index of the layer is high. For example, the refractive index of the "ITO" layer is about 2.0. As an amount of reflection becomes larger due to the high refractive index, fatigue of the eyes of the operator also becomes larger. Therefore, it is necessary to provide a layer having a low refractive index on the surface of the electroconductive layer, thereby preventing reflection to the light-transmissible plate. The layer having the low refractive index may be any conventional low refractive layer, but desirably the layer is a layer including inorganic silica. The layer including inorganic silica can be formed by sputtering the silica or by vacuum evaporation coating of the silica. The film thickness of the layer may be any thickness as long as the layer can appropriately prevent reflection.

In the first embodiment of the present invention, the hard coating layer, the electroconductive layer and the layer having the low refractive index are provided on one surface of the base plate, or on both surfaces of the base plate. In providing them on one surface, it is preferable to provide at least the hard coating layer on another surface to prevent damage of the another surface, and more preferably, the anti-reflection layer is provided on a surface of the hard coating layer.

Next the second embodiment of the present invention is described.

In this embodiment, an anti-reflection film composed of a plurality of layers is provided on a surface of the base plate, the surface being a surface opposite to a surface on which the electroconductive layer is provided.

The anti-reflection film is provided on a surface of the hard coating layer which is provided on one surface of the base plate. The film is constructed of No. 1 layer, No. 2 layer, No. 3 layer and No. 4 layer. The No. 1 layer is provided on the surface of the hard coating layer. The principal ingredient of the No. 1 layer is zirconium oxide. The No. 2 layer is provided on the surface of the No. 1 layer, and the principal ingredient of the No. 2 layer is silicon dioxide. The No. 1 layer becomes a binder between the hard coating layer and the No. 2 layer, and the strength of both adhesions between the hard coating layer and the No. 1 layer and between the No. 1 layer and the No. 2 layer is increased. The No. 2 layer raises the strength of adhesion against both the No. 1 layer and the No. 3 layer. At the same time, if the No. 1 layer and the No. 2 layer are constructed as an equivalent film, the equivalent film can be a film having a middle range refractive index, compared with the No. 3 layer having a high refractive index and the No. 4 layer having a low refractive index. The No. 3 layer is provided on a surface of the No. 2 layer, and the principal ingredient of the No. 3 layer is titanium oxide. The No. 4 layer is provided on a surface of the No. 3 layer, and the principal ingredient of the No. 4 layer is silicon dioxide. The equivalent film (No. 1 layer and No. 2 layer) having the middle refractive index, the No. 3 layer having the high index and the No. 4 layer having the low index, constitute the anti-reflection film as a whole, with the film having the excellent function of preventing reflection.

The above anti-reflection film can be coated by vacuum evaporation or sputtering. Vacuum evaporation is better than sputtering. The assistance of an ion beam may be utilized for forming the film. Titanium oxide can be added into the No. 1 layer including zirconium oxide as long as the effect of the present invention is not reduced. In the same manner, $Ta_2O_5$ can be added to the No. 3 layer including titanium oxide.

The thickness of the anti-reflection film may be any thickness as long as the film can prevent the reflection of visible rays. Preferable optical film thicknesses are as follows when the design wave length $\lambda_0$ is within 450–550 nm.

No. 1 layer; 0.05–0.15 $\lambda_0$,
No. 2 layer; 0.05–0.15 $\lambda_0$,
No. 3 layer; 0.36–0.49 $\lambda_0$, and
No. 4 layer; 0.15–0.35 $\lambda_0$.

Particularly, the thickness of No. 4 layer is desirably 0.25 $\lambda_0$.

The anti-reflection film constructed of a plurality of layers is provided on one surface of the plastic base plate, or on both surfaces of the base plate. In providing the film on one surface, it is desirable to provide the hard coating layer on another surface to prevent damage of the other surface. It is also possible that the anti-reflection film may be positioned on one surface of the base plate, and that the hard coating layer and indium oxide-tin oxide layer ("ITO" layer), or the layer including silicon dioxide besides them are provided on another surface. In such a light-transmissible plate, a layer having the function of preventing reflection is formed on one surface and a layer having the function of shielding electromagnetic waves is formed on another surface. In a structure in which the "ITO" layer is an outermost layer, the film thickness of the "ITO" layer is preferably formed to a small size, for example, 100–500 Å. In a structure in which the layer including silicon dioxide is provided on the "ITO" layer, the film thickness of the "ITO" layer is formed to a large size relatively, for example, 500–1000 Å.

In the light-transmissible plate according to the present invention, a grounding means may be connected thereto to eliminate static electricity. In the case that the "ITO" layer is provided, a grounding wire may be connected to the "ITO" layer directly, or continuity via a certain electroconductive piece between the "ITO" layer and the ground wire may be ensured. As an another means, an outer frame constructed of metal may be provided around the plate, and static electricity may be discharged via the frame. Also in this case, the metal frame may preferably come into contact with the "ITO" layer directly, or continuity via a certain electroconductive piece between the metal frame and "ITO" layer may be maintained.

As described above, according to the first embodiment of the present invention, providing the hard coating layer on the transparent plastic base plate can increase the hardness of the light-transmissible plate, thereby providing characteristics of abrasion resistance and wear resistance to the plate, even if the base plate consists of a plastic having low hardness. Providing the electroconductive layer formed on the hard coating layer and the layer having a low refractive index formed on the electroconductive layer can shield electromagnetic waves, and at the same time can prevent reflection.

According to the second embodiment of the present invention, since the anti-reflection film having excellent static charge resistance is provided on the surface opposite to the surface on which the electroconductive layer is provided, a light-transmissible plate which shields electromagnetic waves can also eliminate static electricity and prevent reflection. Moreover, since the anti-reflection film constructed of a plurality of layers also has excellent strength of adhesion, durability, abrasion resistance, wear resistance, shock resistance, chemical resistance, flexibility, heat resistance, light resistance and weather resistance, excellent optical products can be obtained as a whole.

A representative analysis of components of the electroconductive layer or the anti-reflection film according to the present invention can be carried out by applying Auger electron spectrophotometry. In this method, an electron beam is irradiated onto a surface of a sample positioned in a high vacuum, and the Auger electron released from the surface is measured by an analyzer with a partition of energy. Conditions of the measurement are as follows.

analyzer—"JAMP-10S" produced by Nippon Denshi Kabushiki Kaisha (Japanese company)
degree of vacuum (when measuring an outermost surface)—$1 \times 10^{-7}$ Pa
degree of vacuum (when measuring in a direction of depth)—$6 \times 10^{-6}$ Pa (argon atmosphere)
sampling—to fix a sample on a sample stand holding an edge of the sample down with a copper plate
acceleration voltage—3.0 kV
current flowing through a sample—$1 \times 10^{-8}$ A
diameter of the electron beam—1μm
slit used for the measurement—No. 5
angle of inclination of a sample—40–70 degree
etching condition of Ar ion
　acceleration voltage—3.0 kV
　current flowing through a sample—$3 \times 10^{-7}$ A
　etching speed—200 Å/min. (when $SiO_2$)

The light-transmissible plate shielding electromagnetic waves according to the present invention is effective, particularly when used as a filter for a television set or a display. As other uses, it is possible to apply the plate as a lens, and it is also possible to form it into various shapes, for example, a film or a block.

EXAMPLES

The present invention will be more readily understood from the following.

EXAMPLE 1

A polymethacrylate plate known on the market is used as a transparent plastic base plate. (The plate is "Acrylite" (trade mark) LN-084, produced by Mitsubishi Rayon Kabushiki Kaisha, colored to gray, thickness 2 mm.) A mixture of two compounds (one is obtained by hydrolyzing vinyltryethoxysilane with glacial acetic acid, another is obtained by hydrolyzing methyltyethoxysilane with glacial acetic acid) is used as a paint for hard coating, as shown in example 1 of Japanese Patent Publication No. SHO 59-114501. A paint for the present invention is made by adding sodium acetate, which is a hardener, to the mixture and then by adding a surface lubricant including silicon to the mixture. The paint is coated on a surface of the base plate with thickness of 2 μm, and it is cured by heating. Thus a hard coating layer is formed.

Next, as an electroconductive layer, a mixture of $In_2O_3$ and $SnO_2$ is coated on the hard coating layer, and the mixture is coated with film thickness of 700 Å by sputtering. The condition of the sputtering is at the same condition as shown in example 7-9 of Japanese Patent Publication No. SHO 60-32053. That is, the target utilized is indium-tin alloy, a magnetron-sputtering apparatus is used, the atmosphere is a gas mixture of argon and oxygen (oxygen: 30 vol. %), and the vacuum pressure of the atmosphere is $1 \times 10^{-3}$ Torr.

Next, as a layer having a low refractive index, a film constructed of silicon dioxide is formed on the electroconductive layer. The film is formed by an electron-beam method, using vacuum evaporation coating apparatus (BMC-800T, produced by Shinku Kikai Kogyo Kabushiki Kaisha). The film thickness is 940 Å.

On the other surface of the base plate, the same hard coating layer as above is provided. Then, a film of aluminium oxide and a film of silicon dioxide are formed in order on the hard coating layer, thereby giving a function of hardening the surface and preventing reflection to the plate.

The light-transmissible plate obtained as above has the following functions. Volume of transmission of electromagnetic waves in the frequency of 10 GHz is reduced to about 1/10 volume, compared with only a transparent plastic base plate. When the plate is used as an optical filter for a word processor, it is excellent with respect to preventing reflection, and fatigue of the eyes of the operator is effectively reduced. Hardness of the surface is increased, and thereby the plate is tough against abrasion.

EXAMPLE 2

A hard coating layer on the base plate is formed in the same manner as in example 1. Next, a film of silicon dioxide with thickness of 100 Å is formed as an undercoating layer on the hard coating layer by sputtering. Then, on the undercoating layer, "ITO" layer (film thickness; 1400 Å) coated by sputtering and a film of silicon dioxide coated by vacuum evaporation coating are formed in the same manner as in Example 1. On another surface of the base plate, a hard coating layer is formed in the same manner as in Example 1. Then, on the hard coating layer, layers of $Y_2O_3$ (λ/4), $TiO_2$ (λ/2), $SiO_2$ (λ/4) are provided in order. λ is a design wave length.

The light-transmissible plate obtained as the above had the following functions. The volume of transmission of electromagnetic waves in the frequency of 10 GHz is reduced to about 1/22 volume, compared with only a transparent plastic base plate. When the plate is used as an optical filter for a word processor, it is more effective with respect to preventing reflection and preventing abrasion then Example 1.

EXAMPLE 3

In the example, a polymethacrylate plate having a hard coating layer thereon, known on the market, is used as a base plate. (The plate is "Aqualight" (trade mark) LN-084, produced by Mitsubishi Rayon Kabushiki Kaisha, colored gray, thickness 2 mm.) Other layers, that is, the "ITO" layer and a layer having a low refractive index, are formed in the same manner as in Example 1. The plate in Example 3 is manufactured to an excellent plate as well as in Example 1.

EXAMPLE 4

A polymethacrylate plate ("Aqualight" (trade mark) LN-084, colored a grey, thickness 2 mm) is used as a base plate. As a paint for hard coating, a mixture of two compounds (one is obtained by hydrolyzing vinyltriethoxysilane with glacial acetic acid, another is obtained by hydrolyzing methyltriethoxysilane with glacial acetic acid) is used, as shown in Example 1 of Japanese Patent Publication No. SHO 59-114501. A paint for the present invention was made by adding sodium acetate, which is a hardener, to the mixture, and then by adding a surface lubricant including silicon to the mixture.

The paint is coated on both surfaces of the base plate to a thickness of 2 λm, and then it is cured for 3 hours in 90° C. Thus hard coating layers are formed.

Next, the "ITO" layer is coated on the hard coating layer on one surface of the base plate, and then the $SiO_2$ layer is provided on the "ITO" layer by vacuum evaporation coating. With respect to another hard coating layer on another surface of the base plate, the surface is set in a vacuum evaporation coating tank. After the tank is heated to 60° C. and vacuumed to $1\times 10^{-5}$ Torr, the surface is cleaned with an Argon ion beam generated from the ion beam generating device of the Kaofman type, under the acceleration voltage condition of 500 V. Then, the following four layers are formed by an electron-beam method, in order, from the surface of the base plate:

(1) No. 1 layer; the principal ingredient of the layer is zirconium oxide, the optical film thickness is about 42 nm, and the vacuum condition when forming the layer is $3\times 10^{-5}$ Torr.

(2) No. 2 layer; the principal ingredient of the layer is silicon dioxide, the optical film thickness is about 42 nm, and the vacuum condition when forming the layer is $1\times 10^{-5}$ Torr.

(3) No. 3 layer; the principal ingredient of the layer is titanium oxide, the optical film thickness is about 216 nm, and the vacuum condition when forming the layer is $4\times 10^{-5}$ Torr.

(4) No. 4 layer; the principal ingredient of the layer is silicon dioxide, the optical film thickness is about 120 nm, and the vacuum condition when forming the layer is $1\times 10^{-5}$ Torr.

In the above paragraphs (1)–(4), a design wave length in accordance with the optical film thicknesses is 480 nm.

The plate obtained with the above manners and conditions has a reflection interference color of royal purple, and has an extremely excellent function of preventing reflection whereby the surface reflection factor at 550 nm is about 0.2%. The plate also has an excellent hardness at the surface. A sheet of polyester fiber, which is formed into a square having a side of 2 cm and which is dropped into water, is positioned on the surface of the plate, a load of 2 Kg is put on the sheet, and then the sheet is moved reciprocally maintaining the above load condition, but there is no abrasion thereon.

An atmospheric exposure test is carried out in a manner of exposing the plate outdoors for one month. The result is that there is no break away of the anti-reflection film and no damage of the surface. When the plate is used as an optical filter for a word processor, it is extremely excellent with respect to preventing reflection, and fatigue of the eyes of an operator is highly reduced. Durability of the plate is also excellent.

Moreover, the following measurement was carried out with respect to the property of static charge resistance. An electrostatic voltmeter ("Statiron M", produced by Shishido Seidenki Kabushiki Kaisha, Japanese company) is positioned spacedly 53 mm from the front surface of a CRT. The CRT (NEC-KD551K) is connected to a personal computer (PC-9801E, produced by Nihon Denki Kabushiki Kaisha). When the switch of the personal computer is on, the electrostatic potential measured by "Statiron M" is more than 9 kV. Next, the plate according to the present invention is positioned between the CRT and "Statiron M", at a position far 30 mm from "Statiron M". The plate is grounded. Then, the personal computer was on, but electrostatic potential measured by "Statiron M" is maintained at 0. The effect of static resistance due to the plate was excellent.

Although only several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. A light-transmissible plate for shielding electromagnetic waves comprising:
   a transparent plastic base plate;
   a hard coating layer provided on a surface of said base plate, said hard coating layer having scratch resistance;
   an electroconductive layer provided on the surface of said hard coating layer, said electroconductive layer being formed in an atmosphere of oxygen and at a temperature of less than 150° C.; and
   a layer provided on the surface of said electroconductive layer, said layer having a lower refractive index than the refractive index of said electroconductive layer.

2. The light-transmissible plate of claim 1, wherein said electroconductive layer is a layer containing indium oxide and tin oxide.

3. The light-transmissible plate of claim 2, wherein said layer containing indium oxide and tin oxide is formed by sputtering.

4. The light-transmissible plate of claim 2, wherein said layer containing indium oxide and tin oxide is formed by evaporation coating, said evaporation coating being performed using plasma due to high-frequency electric discharge, in an atmosphere of oxygen and at a temperature of less than 150° C., with the assistance of an ion gun.

5. The light-transmissible plate of claim 1, wherein a film thickness of said electroconductive layer is within the range of 100–3000 Å.

6. The light-transmissible plate of claim 1, wherein said transparent plastic base plate is a colored plate.

7. The light-transmissible plate of claim 1, wherein said layer having said low refractive index is a layer constructed of inorganic silica.

8. The light-transmissible plate of claim 7, wherein said layer constructed of inorganic silica is formed by a vacuum evaporation coating.

9. The light-transmissible plate of claim 1, wherein a ground wire is connected to said electroconductive layer.

10. The light-transmissible plate of claim 1, wherein an outer frame is provided around said light-transmissible plate, said outer frame extending along the edge of said light-transmissible plate and coming into contact with said electroconductive layer.

11. The light-transmissible plate of claim 1, wherein said light-transmissible plate is an optical filter for a cathode-ray tube.

12. A light-transmissible plate for shielding electromagnetic waves comprising:
   a transparent plastic base plate;
   a hard coating layer provided on a surface of said base plate, said hard coating layer having scratch resistance;

an electroconductive layer provided on the surface of said hard coating layer, said electroconductive layer being formed in an atmosphere of oxygen and at a temperature of less than 150° C.;

a layer provided on the surface of said electroconductive layer, said layer having a lower refractive index than the refractive index of said electroconductive layer; and an anti-reflection film provided on another surface of said plastic base plate, said anti-reflection film being composed of a plurality of layers.

13. The light-transmissible plate of claim 12, wherein said anti-reflection film comprises:

a hard coating layer provided on said another surface of said base plate, said hard coating layer having scratch resistance;

a No. 1 layer provided on a surface of said hard coating layer and containing zirconium oxide;

a No. 2 layer provided on a surface of said No. 1 layer and containing silicon dioxide;

a No. 3 layer provided on a surface of said No. 2 layer and containing titanium oxide; and A No. 4 layer provided on a surface of said No. 3 layer and containing silicon dioxide, and said No. 1 layer and said No. 2 layer being constructed as an equivalent film.

14. The light-transmissible plate of claim 13, wherein the optical film thicknesses of said No. 1–No. 4 layers are the following thicknesses under a condition wherein a design wave length $\lambda_0$ is within 450–550 nm;

No. 1 layer; 0.05–0.15 $\lambda_0$,
No. 2 layer; 0.05–0.15 $\lambda_0$,
No. 3 layer; 0.36–0.49 $\lambda_0$, and
No. 4 layer; 0.15–0.35 $\lambda_0$.

15. The light-transmissible plate of claim 13, wherein said No. 1–No. 4 layers are films formed by evaporation coating.

16. The light-transmissible plate of claim 13, wherein said No. 1–No. 4 layers are films formed by sputtering.

17. The light-transmissible plate of claim 12, wherein said light-transmissible plate is an optical filter for a cathode-ray tube.

18. The light transmissible plate of claim 1, wherein said hard coating layer contains a member selected from the group consisting of polyorganosiloxane, silica, alumina, and acrylic.

19. The light transmissible plate of claim 1, wherein said hard coating layer has a thickness of about 1–10$\mu$.

20. The light transmissible plate to claim 1, wherein said No. 4 layer has a thickness of 0.25$\lambda_0$.

21. The light transmissible plate of claim 1, wherein said electromagnetic waves are generated from a cathode ray tube.

22. The light transmissible plate of claim 12, wherein said electromagnetic waves are generated from a cathode ray tube.

* * * * *